United States Patent [19]

Numakura et al.

[11] Patent Number: 5,406,394
[45] Date of Patent: Apr. 11, 1995

[54] COLOR REPRODUCING METHOD USED IN AN IMAGE DATA PROCESSING SYSTEM COMPRISING INDEPENDENT INPUT AND OUTPUT DEVICES

[75] Inventors: Takashi Numakura; Iwao Numakura, both of Tokyo, Japan

[73] Assignee: Yamotoya & Co., Ltd., Tokyo, Japan

[21] Appl. No.: 206,157

[22] Filed: Mar. 7, 1994

[30] Foreign Application Priority Data

Aug. 6, 1993 [JP] Japan .................................. 5-213592

[51] Int. Cl.⁶ .............................................. G03F 3/08
[52] U.S. Cl. ...................................... 358/518; 358/521
[58] Field of Search ................ 358/518, 519, 520, 521

[56] References Cited

U.S. PATENT DOCUMENTS

4,929,979  5/1990  Kimoto et al. ....................... 358/518
4,941,038  7/1990  Walowit .............................. 358/518

*Primary Examiner*—Edward L. Coles, Sr.
*Assistant Examiner*—Kimberly A. Williams
*Attorney, Agent, or Firm*—Wenderoth, Lind & Ponack

[57] ABSTRACT

A method for reproducing color of a color film original independently of systems and equipment making up an open image data processing system such as a desk top publishing system. An input device of the open image data processing system is provided with a function to obtain light intensity values, rather than density values, from a color film original, and an output device of the system is provided with a function to output tonal intensity values determined by applying the light intensity values to a specific tonal conversion formula.

6 Claims, 3 Drawing Sheets

COLOR REPRODUCING METHOD USED IN AN IMAGE DATA PROCESSING SYSTEM COMPRISING INDEPENDENT INPUT AND OUTPUT DEVICES

BACKGROUND OF THE INVENTION

1. Field of the Invention

The present invention relates to a novel color reproducing method adaptive to a recent open image data processing system, that is, an image data processing system consisting of systems and equipments each of which is independently specialized to its function.

More specifically, this invention relates to a novel color reproducing method developed to overcome the biggest problem retained in such an open image data processing system in which faithful and accurate color reproduction is difficult since each of the systems and equipments making up the open image data processing system is distinctively organized.

2. Description of Prior Art

The trend in the image data processing system is that systems or equipments forming the image data processing system such as a color input device (such as imagesetter, output scanner, etc.), a platform (such as image data processing unit or CPU unit of a computer) and a color output device (such as imagesetter, output scanner, etc.) are independently specialized to respective functions. As a consequence, such an open image data processing system can be made up of systems and equipments manufactured by not only the same maker but also different makers.

A desk top publishing system (DPT) is a typical example of such an open image data processing system. In actual circumstances, a user of the desk top publishing system combines an input device, an output device and the like at will to make up the system, in order to adapt the system to the actual conditions of the user's work. A feature of the desk top publishing system is a high versatility allowed when the user selects component systems and equipments and combines them to form the whole system.

As is well known, each data such as character, graphics, image, or the like are recognized and processed on the same dimension as computer data. PostScript (tradename) is a computer language that is mainly used for processing of such data. It is said that the spread of PostScript as a standard language contributed to a wide practical use of the desk top publishing system to a great extent. In the desk top publishing system, image data are described in said PostScript language and stored in PostScript format. When the image data are outputted, the computer interprets the image data in PostScript language, outputs and develops them. In 1992, the desk top publishing system started to bypass the conventional plate-making work and to complete the process from input to output. For example, a part of a color printed magazine was made through a plate-making system relying on a desk top system. This was said to be the arrival of practical use of the desk top system (p.11-26, March, 1993, Japan Camera Society Journal, Japan Camera Society).

In an open system made up of various sorts of systems and equipments, a particular problem is how to keep quality of an image, more specifically, how to maintain the color reproducibility among the systems and equipments at a constant level or to maintain consistency of the color. This is natural since in a product resulted from a desk top publishing system, the quality of image portions is appraised on a level quite higher than character portions.

In consequence, there is an attempt to introduce a color management system to an open image data processing system as seen in the desk top publishing system to form a so-called open color system that is opened with respect to even the processing of color. To cite an example, Adobe Systems adopts a manner to provide a converting function for a color space to an output system to download a desired conversion algorithm or a lookup table (LUT) from a host computer to the output system. Incidentally, it is a matter of course that said conversion function can comply with a plurality of color spaces in accordance with an output form of the output system, for example, a printed image of a laser printer in a CMYK system or a CRT image including a liquid crystal display image in RGB system.

As a color space, which is a base of said color management, there have been proposed various color systems by CIE (Commission Internationale de l'Eclairage) such as the RGB color system, XYZ color system, and Lab or Luv system obtained by mathematically converting (i.e., by matrix conversion of) the XYZ color system. Such color systems do not accurately reflect actual colors (that is, color perception) from limitation of colorimetry conditions (such as field angle, employed light source etc.). No uniform standard has been found yet, and the research has been thus continued.

From a view to establish a color reproducing method independent of the various systems and equipments, which make up an open image processing system, a concept of "device independent color" (DIC) that means a color reproducing method being effective independently of systems and equipments has come to be important. As one way to establish said DIC, there is a proposal to introduce color system conversion where data is converted, for example, from RGB to XYZ, then from XYZ to Lab by the matrix conversion as described above, and data converted into Lab is used as common image data in the systems and equipments. This proposal is, however, not sufficient since the various color spaces proposed by CIE have restrictions and limitations as mentioned above.

If the above proposal is adopted as the second best policy, the following shortfalls and disadvantages can be easily noticed in the practice of actual image data processing work. Such shortfalls and disadvantages are:

(1) If picture image information (density information) is obtained by means of a given input scanner from a color original or form, as a typical example, a color film original (of a transparency type) admitted that an object has been faithfully photographed (or recorded) thereon, said picture image information is, nevertheless, dependent of characteristic curves (also called as, photographic characteristic curves of R, G and B) of a film that has been used upon photographing the object.

(2) The above situation is the same if using the same film, unifying the photographing conditions to make a standard original, and processing the image data of each non-standard image on the basis of image data of the standard original as a reference.

(3) There are used various films to take an original thereon, each of which has its own characteristic curves (i.e., photographic characteristic curves).

Under such circumstances, image data in Lab admitted by CIE as image data obtained from a standard original taken on a given film is useless as common data (or a reference base).

(4) In a given input scanner system, conversion from RGB color system to XYZ color system is, in general, conducted by the following formula 1 or formula 2;

$$\begin{pmatrix} X \\ Y \\ Z \end{pmatrix} = [SCF] \begin{pmatrix} R \\ G \\ B \end{pmatrix} \quad (1)$$

$$\begin{pmatrix} X \\ Y \\ Z \end{pmatrix} = [SCF] \begin{pmatrix} R^{1/\gamma} \\ G^{1/\gamma} \\ B^{1/\gamma} \end{pmatrix} \quad (2)$$

where

SCR: a calibration function of a scanner; and $\gamma$: a correction value.

It is, however, doubtful that a unified function or $\gamma$ value can be commonly employed in various input scanner systems. If possible, said shortfall, that is, a problem of dependency on characteristic curves of a film still remains.

In the case of a color output device (such as imagesetter and output scanner) used in an open image data processing system such as a desk top system, such color output devices used to output, for example, halftone images have different and various tonal conversion formulae. These tonal conversion formulae used to form output images are different depending on the device, thus lacking uniformity among them. As is well known, a dynamic range of a color film original (in RGB system) largely differentiates from that of an output image (in CMY system). As a consequence, it is necessary to rationally compress the tone (including color tone and density gradation) or convert the tone (i.e., conversion from a continuous tone to a halftone) when producing a halftone picture. At that time, unified adjustment of color tone and density gradation is dispensable upon compression and conversion of the tone. The conversion of density gradation in existing output systems, which is an especially important process, has been carried out on the basis of experiences or intuitions. This is hardly rational.

An object of this invention is to provide a novel method to establish DIC (Device Independent Color, more concretely, a color reproducing method independent of systems and equipments), which is said to be difficult in the image processing work in an open image data processing system such as a desk top systems.

The object of this invention is to establish DIC in an open image data processing system and is accomplished by:

(1) to a color input device to which color picture image information is inputted, providing functions to obtain and retain light intensity values, which are picture information, using characteristic curves, i.e., photographic characteristic Curves Of a film that has been used for a color film original when picking up the picture image information from the color film original, said color film original is a typical example as an original in the art; and (2) to a color output device serving to output the picture image information, providing functions to convert the tone (including color tone and density gradation) of the color film original using a specific tonal conversion formula, then output them. With the above technical constitution, the shortfalls of the conventional system can be overcome and color reproducibility of color (consistency of color) can be maintained in the system or among the systems.

SUMMARY OF THE INVENTION

To overcome the above drawbacks in the prior art, this invention provides a method, for use in an image data processing system comprising an input device and an output device into and from which color picture information is independently inputted and outputted, for reproducing a color of a color film original independently of system and equipments forming the image data processing system comprising the steps of providing a function to the color input device, to which the color picture information inputted, to scan the color film original to obtain RGB data that are density information values (Dn), convert the RGB data that are density information values (Dn) into light intensity values (xn) and retain the light intensity values (xn) therein, and providing a function to the color output device, from which the color picture information is outputted, to receive the light intensity values (xn) from the color input device, convert the light intensity values (xn) into tonal intensity values (y) using a following tonal conversion formula to reproduce a desired color:

$$y = y_H + [\alpha(1-10^{-k \cdot x})/(\alpha-\beta)] \cdot (y_S - y_H)$$

where x: a basic light intensity value shown by $x = (x_n - x_H)$, that is a difference between a picture information value (xn) correlating to a light intensity obtained from a density value (Dn) of a given pixel at n point in the color film original through a density characteristic curve defined in a D–X orthogonal coordinate system and a picture information value ($x_H$) correlating with light intensity corresponding to a density value ($D_H$) of the brightest part (H part) of the color film original 5, a D axis of the D–X orthogonal coordinate system representing density of the color film used upon photographing the color film original 5 and an X axis of the D–X orthogonal coordinate system representing picture information values correlating with light intensity;

y: a tonal intensity value of a pixel in a reproduced picture corresponding to the given pixel at the n point of the color film original;

$y_H$: a tonal intensity value set in prior to the brightest part of tile reproduced picture corresponding to the brightest part of the color film original 5;

$y_S$: a tonal intensity value set in prior to the darkest part of the reproduced picture corresponding to the darkest part of the color film original 5;

$\alpha$: a surface reflectance of a recording medium of the reproduced picture;

$\beta$: a value determined by $\beta = 10^{-\tau}$;

k: a value determined by $k = \gamma/(x_S - x_H)$, where $x_S$ is a picture information value correlating to light intensity determined from the density value ($D_S$) of the darkest part of the color film original 5 through the density characteristic curve defined in the D–X orthogonal coordinate system; and γ: a given coefficient.

This invention allows establishment of DIC (Device Independent Color, that is, a color reproducing method independent of systems and equipments) in an image data processing system including input and output devices both of an independent type, to and from which picture information is inputted and outputted.

The invention is important in the light of the present condition that an image data processing system changes from a stand-alone type to an open type more and more, reflecting combination of systems and working environment of the user. There is a tendency to combine various associated systems (such as color input device, color output device, central control system, etc.) manufactured by various and different makers as desired to form an image data processing system. There is therefore an increasing demand of a technique to uniformly reproduce the color that is the most difficult in the image data processing work and is required to bear a high quality result as the image data processing system becomes more open.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE INVENTION

This invention will be hereinafter described in detail.

As stated above, this invention is directed to a color reproducing method, so-called DIC, made use in an open image processing system such as a desk top publishing system independently of the arrangement or functions of the system. This invention is accomplished by providing functions to perform the above method to the input device and output device of the system, which input and output devices play important roles upon processing image data.

The followings are commercially available systems and equipments making up said open desk top publishing system:

(1) As the color input device: HORIZON, ARCUS PLUS, VISION 35 (AGFA GEVART); Chroma Graph (LINOTYPE-HELL); Smart Scanner PS, Smart Two PS, Leaf Scan 35, Leaf Scan 45 (SCITEX); Genascan DT-1030AI (DAINIPPON SCREEN); Color Getter II pro, Color Getter II (MARUBENI ELECTRONICS); ART SCAN (KOBELCO); DUAL SCAN DS-5055 (SHINKO DENKI); ScanMaker II, 45A and 1850S (TAXAN); QCS-2462, Scanmaster D4000 (IMAPRO); ScanMate (BINARY); GT-8000, GT-6000 (EPSON); RFS2035 (KODAK); ISOMET 405 Color Scanner (ISOMET); MAGNASCAN 200i (FUJI-CROSFIELD); COOLSCAN (NIKON); XRS,UMAX630, UMAX 1200, Barneyscan 3515, Imapro, ArtixC+5, Nikon 8-bit, Nikon 12-bit, New Leaf (Autorange), Old Leaf (Autorange), Old Leaf (Autorange), Sharp JX 600, Sharp JX320 [MAC]; Leaf 35, Optonics, rgb Color, OptoScan, Agfa Focus, Agfa ACS-100, Howtele D4000 (PPT); Optronics, Screen 1015 (DTI), etc.

(2) As color output device: Select Set (5000, 7000), Accuset 1000 [AGFA GEVART]; Linotronic 260, 330, 530, 630, 830, 930, R3020PS and P3030PS (LINOTYPE-HELL); Genasett 2035 and 1065 (DAINIPPON SCREEN), etc.

A detailed description will be next made of a technical constitution of this invention, used to establish DIC (Device Independent Color, that is, a color reproducing method independent of systems and equipments) between a color input device and a color output device.

According to this invention, the color input system has a function to obtain, from a color film original, picture information of the color film original that is free from inherent property of a color film having been used upon photographing the original. When a halftone picture, for example, a halftone dot picture is produced from a color film original in a continuous tone, density information values of emulsion layers (corresponding to CMY on the output side of the entire system) are normally taken out through respective RGB filters from the color film original and subjected to a tonal-conversion process to produce a reproduced picture. The above term "tonal-conversion" is herein used including color-tone and gradation. Therefore, the DIC is closely related with the term "tonal-conversion". It is assumed in this invention that when the "tonal-conversion" is independent of systems and equipments, the DIC is established.

As stated above, production of a reproduced picture has been done based on density information values as picture information values. To the contrary, this invention does not use density values, but instead uses light intensity values as picture information to conduct tonal-conversion in order to produce, for example, a DTP picture (such as a color printed magazine) having a good quality independent of a picture quality of its color film original such as an over-, normal- or under-exposed, high-key or low-key, variously color-fogged, or faded original. This is a noticeable point different from the conventional technique.

Employment of light intensity values of an original picture, instead of density values, when conducting a tonal-conversion in this invention is an original idea of the inventors of this invention. The light intensity values obtained from an object, which should be the base of the original picture and can be called as a real picture such as an actual scenery, incident into photosensitive materials of a color film used when photographing the object are genuine picture information independent of photographic characteristic curves inherent in the photosensitive materials of the color film, while the density values are quite dependent on such photographic characteristic curves (that is, characteristics of the photosensitive materials). Use of the light intensity values may permit rational and uniform conversion of tone if the original pictures are of various picture quality.

For the above reason, a color input device should be provided with a function to obtain the light intensity values which become genuine picture information from a color film original when a reproduced picture is produced from the color film original.

The light intensity values can be readily determined from the photographic density, using characteristic curves of photosensitive materials (photosensitive emulsions) of a color film on which the original picture has been taken. Said photographic characteristic curves are expressed in a D-X orthogonal coordinate system, whose ordinate axis is assigned to density (D) and abscissa axis is assigned to light exposure (X). In order to determine the light intensity values, the photographic characteristic curves of a color film on which the original picture has been photographed need to be expressed with functional equations. Through the functional equations, a light intensity value ($x_n$) of a pixel can be determined from a density value ($D_n$) of a corresponding pixel (n point) of the original picture. It is sufficient to employ photographic characteristic curves that are offered by the maker.

Figure 1:
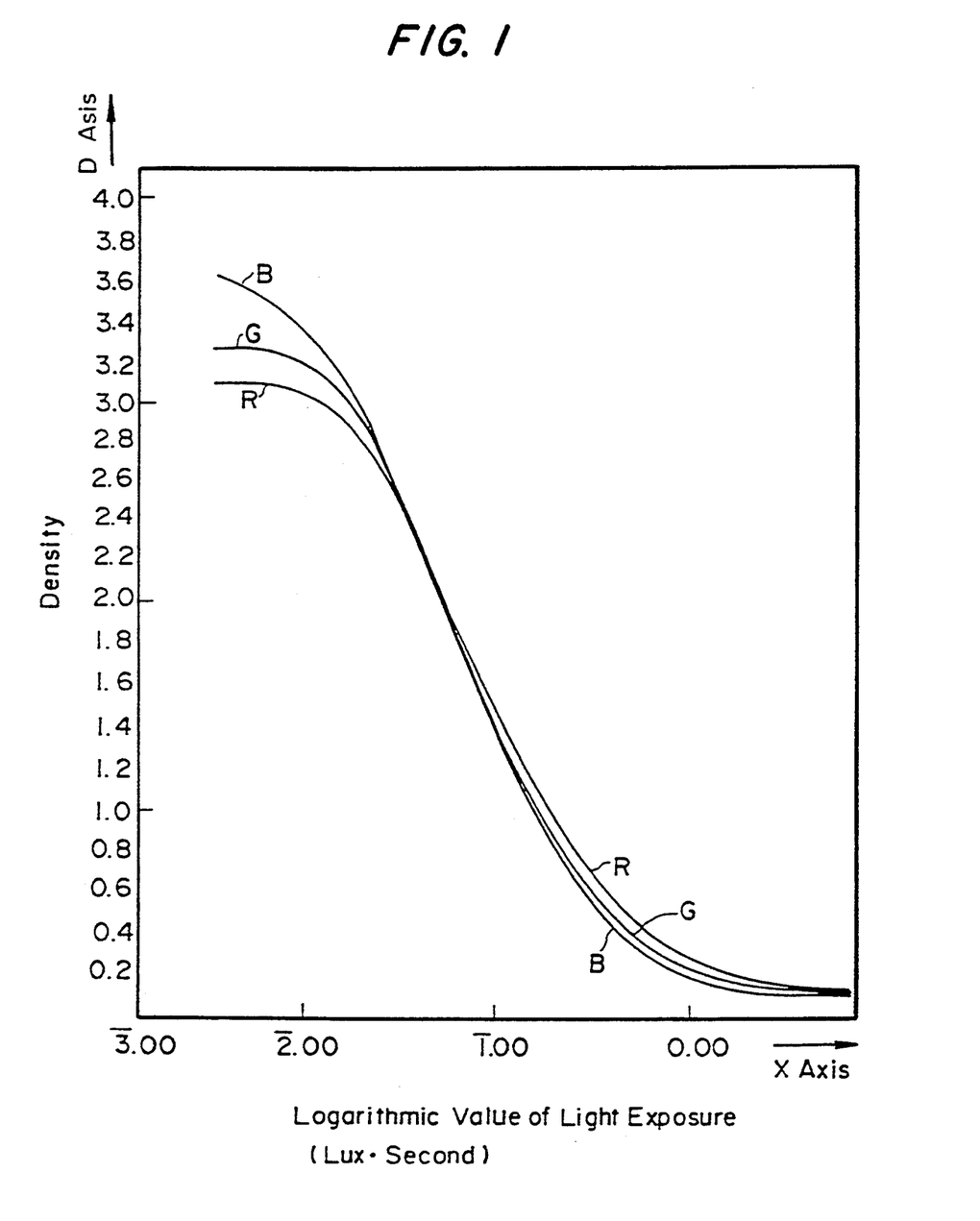
FIG. 1 is a graph showing photographic characteristic curves R, G and B of a film photosensitive material used to make a color film original.

As an example, FIG. 1 shows photographic characteristic curves R, B and G of Echtachrome 64 (tradename), Professional Film (day light) manufactured by Eastman Kodak. There is no limitation when expressing the photographic characteristic curves with functional equations. Any suitable manner is possible. As shown in FIG. 1, the photosensitive emulsions of R, G and B have, of course, respective characteristic curves. Therefore, each of the curves needs to be expressed with functional equations used to determine light intensity values when making plates corresponding to the respective color.

Table 1 shows the functional equations to convert density values into light intensity values for the respective emulsions R, G and B. Incidentally, there are provided a plurality of sections of the density level in order to express the photographic characteristic curves with the equations as accurately as possible.

TABLE 1

Formula for converting a color original density value (D) into a light intensity value (X)

| Emulsion layer | No. | D | X |
|---|---|---|---|
| R | 1 | 0.1444–0.8000 | $X = \log\{(D-0.0756) \div 0.05158\}$ |
|   | 2 | 0.8000–1.0000 | $X = 1.1475 + 0.7000(D-0.8000)$ |
|   | 3 | 1.0000–1.2000 | $X = 1.2873 + 0.6000(D-1.0000)$ |
|   | 4 | 1.2000–1.4000 | $X = 1.4075 + 0.3250(D-1.2000)$ |
|   | 5 | 1.4000–2.2000 | $X = 1.5125 + 0.3000(D-1.4000)$ |
|   | 6 | 2.2000–2.6000 | $X = 1.9125 + 0.5125(D-2.2000)$ |
|   | 7 | 2.6000–2.8000 | $X = 2.1175 + 0.7125(D-2.6000)$ |
|   | 8 | 2.8000–3.175 | $\frac{1}{100} \cdot 10^{(D-2.2638)\div 0.4455}$ $X = 1.15 + e$ |
| G | 1 | 0.1444–0.8000 | $X = \log\{(D-0.0841) \div 0.04517\}$ |
|   | 2 | 0.8000–1.0000 | $X = 1.2000 + 0.7500(D-0.8000)$ |
|   | 3 | 1.0000–1.4000 | $X = 1.3500 + 0.5825(D-1.0000)$ |
|   | 4 | 1.4000–1.8000 | $X = 1.5750 + 0.50825(D-1.4000)$ |
|   | 5 | 1.8000–2.6000 | $X = 1.7775 + 0.4250(D-1.8000)$ |
|   | 6 | 2.6000–2.8000 | $X = 2.1175 + 0.4125(D-2.6000)$ |
|   | 7 | 2.8000–3.0000 | $X = 2.2000 + 0.8375(D-2.8000)$ |
|   | 8 | 3.0000–3.2178 | $\frac{1}{100} \cdot 10^{(D-2.7035)+0.3028}$ |

TABLE 1-continued

Formula for converting a color original density value (D) into a light intensity value (X)

| Emulsion layer | No. | D | X |
|---|---|---|---|
|   |   |   | $X = 1.2275 + e$ |
| B | 1 | 0.1333–0.8000 | $X = \log\{(D-0.0758) \div 0.4314$ |
|   | 2 | 0.8000–1.0000 | $X = 1.2250 + 0.625(D-0.8000)$ |
|   | 3 | 1.0000–1.4000 | $X = 1.3500 + 0.5625(D-1.0000)$ |
|   | 4 | 1.4000–1.8000 | $X = 1.5750 + 0.30825(D-1.4000)$ |
|   | 5 | 1.8000–2.6000 | $X = 1.7775 + 0.4250(D-1.8000)$ |
|   | 6 | 2.6000–2.8000 | $X = 2.1175 + 0.4125(D-2.6000)$ |
|   | 7 | 2.8000–3.0000 | $X = 2.2000 + 0.3250(D-2.8000)$ |
|   | 8 | 3.0000–3.2000 | $X = 2.3050 + 0.5375(D-3.0000)$ |
|   | 9 | 3.2000–3.4000 | $X = 2.4125 + 0.5765(D-3.2000)$ |
|   | 10 | 3.4000–3.6000 | $X = 2.3278 + 1.7380(D-3.4000)$ |

In Table 1, when the photographic characteristic curves R, G and B were expressed with the functional equations, the scale on the D axis showing density values of the color photographic original and the scale on X axis showing the light intensity values expressed with log E of an object (a real picture) were assumed to be the same to formulate the D and X. The inventors are of an opinion that this scaling with respect to the D and X axis is quite rational for the following reason.

On the photographic density curve, logarithmic values (log E=log Ixt) of light exposure E are positioned along the X axis. This physical quantity is evaluated with the logarithmic discriminating property of human visual sensation to brightness. On the other hand, physical quantity relating to density positioned along the D axis is also logarithmically sensed by human eyes. Accordingly, it is considered that no irrationality is induced if the D axis is correlated with the X axis on the same scale.

Meanwhile, it should be noted that it is possible to employ any scaling since the above example is only for the sake of convenience. It is, for example, possible to do formulation on the basis of a relationship between mathematical values of the D and X axis. In this invention, physical quantity on the X axis is expressed with a term "light intensity value" that is a concept including light exposure, attaching the relative meaning mentioned above.

As stated hereinbefore, the present invention is based on, not density values ($D_n$ values) of a color photographic original, but picture information, that is, light intensity values ($x_n$ values) given by an object (real picture or real scene) expressed along the X axis upon performing tonal-conversion. Since $D_n$ values shown in FIG. 1 are correlated with $x_n$ values also shown in FIG. 1 by formulating the photographic density characteristic curves as stated above, the $x_n$ values may be readily determined from the $D_n$ values. A color input device according to this invention has a function to determine a light intensity value ($x_n$) of a pixel from a density value ($D_n$) of a corresponding pixel of a color film original in the above manner and store said light intensity value in a desired memory.

In order to determine the light intensity value (xn) from the corresponding density value (Dn), a density measuring mechanism in an existing color input device is provided with a conversion program for converting Dn to xn, in other words, complied with a software so as to easily determine the xn value. It is a matter of course that the software program has, preferably, a content of functional formulae of photographic characteristic curves of a film often used for color film originals. The xn values may be determined from the Dn values according to a brand of a given color film original. These commercially available films are, for example,: Ektachrome 64 shown in FIG. 1, Ektachrome Duplicating Film 6121, Ektachrome 50 (professional film, tungsten type), Ektachrome 200 (professional film 3036), Kodachrome 25 (professional, tungsten type), Ektachrome 200 (professional, daylight) of Eastman Kodak; AGFA CHROME-1000-RS, 50-RS, 200-RS, 100-RS of AGFA GEVART; Fujichrome-50 (professional, daylight), Fujichrome 100 (professional, daylight) of Fuji Film, etc.

Along with Table 1, Tables 2 and 3 show functional formulae for Dn and xn of photographic density curves of another films. Table 2 is of AFGACHROME-100-RS and Table 3 of Fujichrome 50 (professional D).

TABLE 2

| No. | Density value (D) | Light intensity value (X) |
|---|---|---|
| R | | |
| 1 | 0.1571–0.1857 | X = 0.5000 + 17.4825 (D-0.1571) |
| 2 | 0.1857–0.2143 | X = 1.0000 + 7.4930 (D-0.1857) |
| 3 | 0.2143–0.2714 | X = 1.2143 + 3.5447 (D-0.2143) |
| 4 | 0.2714–0.3249 | X = 1.4167 + 2.5245 (D-0.2714) |
| 5 | 0.3249–0.4143 | X = 1.5972 + 1.4398 (D-0.3429) |
| 6 | 0.4143–0.5000 | X = 1.7000 + 1.2322 (D-0.4143) |
| 7 | 0.5000–0.5857 | X = 1.8056 + 0.9720 (D-0.5000) |
| 8 | 0.5857–0.7143 | X = 1.8889 + 0.8639 (D-0.5857) |
| 9 | 0.7143–0.1000 | X = 2.0000 + 0.6321 (D-0.7143) |
| 10 | 1.0000–2.2143 | X = 2.1806 + 0.4748 (D-1.0000) |
| 11 | 2.2143–2.4000 | X = 2.7571 + 0.6155 (D-2.2143) |
| 12 | 2.4000–2.5556 | X = 2.8714 + 0.8265 (D-2.4000) |
| 13 | 2.5556–2.7000 | X = 3.0000 + 1.3850 (D-2.5556) |
| 14 | 2.7000–2.7714 | X = 3.2000 + 2.6457 (D-2.7000) |
| 15 | 2.7714–2.8000 | X = 3.3889 + 21.3671 (D-2.7714) |
| G | | |
| 1 | 0.1857–0.2143 | X = 0.5000 + 17.4825 (D-0.1857) |
| 2 | 0.2143–0.2429 | X = 1.0000 + 7.4930 (D-0.2143) |
| 3 | 0.2429–0.2714 | X = 1.2143 + 7.1018 (D-0.2429) |
| 4 | 0.2714–0.4000 | X = 1.4167 + 1.4036 (D-0.2714) |
| 5 | 0.4000–0.5000 | X = 1.5972 + 1.1110 (D-0.4000) |
| 6 | 0.5000–0.7143 | X = 1.7083 + 0.8427 (D-0.5000) |
| 7 | 0.7143–0.8472 | X = 1.8889 + 0.8360 (D-0.7143) |
| 8 | 0.8472–1.0000 | X = 2.0000 + 0.6361 (D-0.8472) |
| 9 | 1.0000–2.2714 | X = 2.0972 + 0.5250 (D-1.0000) |
| 10 | 2.2714–2.5000 | X = 2.7647 + 0.7078 (D-2.2714) |
| 11 | 2.5000–2.5833 | X = 2.9265 + 0.8824 (D-2.5000) |
| 12 | 2.5833–2.7286 | X = 3.0000 + 1.1796 (D-2.5833) |
| 13 | 2.7286–2.8000 | X = 3.1714 + 3.2017 (D-2.7286) |
| 14 | 2.8000–2.8429 | X = 3.4000 + 13.9860 (D-2.8000) |
| B | | |
| 1 | 0.1288–0.1571 | X = 0.5000 + 17.5439 (D-0.1286) |
| 2 | 0.1571–0.1857 | X = 1.0000 + 7.4930 (D-0.1571) |
| 3 | 0.1857–0.2714 | X = 1.2143 + 2.3617 (D-0.1857) |
| 4 | 0.2714–0.3714 | X = 1.4167 + 1.8050 (D-0.2714) |
| 5 | 0.3714–0.5000 | X = 1.5972 + 1.2963 (D-0.3714) |
| 6 | 0.5000–0.7714 | X = 1.7639 + 0.8699 (D-0.5000) |
| 7 | 0.7714–1.0000 | X = 2.0000 + 0.6684 (D-0.7714) |
| 8 | 1.0000–2.2143 | X = 2.1528 + 0.5039 (D-1.0000) |
| 9 | 2.2143–2.4285 | X = 2.7647 + 0.7554 (D-2.2143) |
| 10 | 2.4285–2.5000 | X = 2.9265 + 1.0280 (D-2.428) |
| 11 | 2.5000–2.6571 | X = 3.0000 + 1.0910 (D-2.5000) |
| 12 | 2.6571–2.7286 | X = 3.1714 + 3.1972 (D-2.6571) |
| 13 | 2.7286–2.7714 | X = 3.4000 + 14.0187 (D-2.7286) |

TABLE 3

| No. | Density value (D) | Light intensity value (X) |
|---|---|---|
| R | | |
| 1 | 0.1000–0.1500 | X = 0.5000 + 10.6000 (D-0.1000) |
| 2 | 0.1500–0.2000 | X = 1.0000 + 5.3840 (D-0.1500) |
| 3 | 0.2000–0.3000 | X = 1.2692 + 2.9230 (D-0.2000) |
| 4 | 0.3000–0.4000 | X = 1.5615 + 1.3080 (D-0.3000) |
| 5 | 0.4000–0.5000 | X = 1.6923 + 1.1540 (D-0.4000) |
| 6 | 0.5000–0.7308 | X = 1.8077 + 0.8332 (D-0.5000) |
| 7 | 0.7308–1.0000 | X = 2.0000 + 0.7578 (D-0.7308) |
| 8 | 1.0000–1.5000 | X = 2.2040 + 0.5920 (D-1.0000) |
| 9 | 1.5000–2.0000 | X = 2.5000 + 0.5834 (D-1.5000) |
| 10 | 2.0000–2.7500 | X = 2.7917 + 0.4167 (D-2.0000) |
| 11 | 2.7500–3.0000 | X = 3.1042 + 0.5832 (D-2.7500) |
| 12 | 3.0000–3.1000 | X = 3.2500 + 0.8750 D-3.0000) |
| G/B | | |
| 1 | The same as steps No. 1 through 10 for R | |
| 2 | | |
| 3 | | |
| 4 | | |
| 5 | | |
| 6 | | |
| 7 | | |
| 8 | | |
| 9 | | |
| 10 | | |
| 11 | 2.7500–3.0000 | X = 3.1042 + 0.4500 (D-2.7500) |
| 12 | 3.0000–3.1000 | X = 3.2167 + 0.6660 (D-3.0000) |

Next a description will be given regarding a structure of a color output device to accomplish DIC.

A color output device according to this invention has a function to receive light intensity values (xn) as picture information obtained in the color input device and perform color-separation using the tonal conversion formula set forth before, that is, converting the tone of the picture. When output data obtained by conducting the tonal conversion formula of this invention is illustrated in a graph with light intensity values (xn) along the abscissa axis (X axis) and tonal intensity values (y) along the ordinate axis, a resulting curve, naturally, becomes a color separation curve or tonal conversion curve so-called in the field of art.

When differentiating between the conventional color separation technique and the color separation technique or the tonal conversion technique of this invention in a broader sense with a use of said term "color separation curve", the following discrimination (or nomenclature) is helpful:

(1) The conventional color separation technique is based on density information values positioned along the density axis (D axis) of a photographic characteristic curve, as mentioned before, thus depending on the D axis color separation curve.

(2) On the other hand, the color separation technique according to this invention is based on light intensity information values positioned along light intensity values (X axis) of a photographic characteristic curve, thus depending on the X axis color separation curve.

In the case of a color output device according to this invention producing a reproducing picture in a halftone, a light intensity value (xn) is substituted in said tonal conversion formula to determine a dot area % value as a tonal intensity value so as to set an X axis color separation curve, as will be described later.

A brief description will be now made of the course in which the tonal conversion formula has been derived and the property of the tonal conversion formula.

When a printed picture in a halftone is produced as a reproduced picture from an original picture in a DTP system, the tonal conversion formula used to determined a dot area % value (y) set to a pixel of the printed picture corresponding to a pixel of the original picture can be derived on the basis of a density formula (photographic density, optical density) generally admitted:

$$D = \log I_o/I = \log 1/T$$

where
- Io: quantity of incident light;
- I: quantity of reflected light or quantity of transmitted light; and
- T=I/Io: reflectance or transmittance.

When the above general density formula relating with density D is applied to plate-making or printing:

Density (D') in plate-making or printing
= log Io/I
= log (area unit×reflectance of a paper)/{(unit area− dot area)×reflectance of a paper+dot area×surface reflectance of an ink}

$$= \log \alpha A/[\alpha\{A-(d_1+d_2\ldots d_n)\}+\beta(d_1+d_2+\ldots d_n)]$$

where
- A: unit area;
- $d_n$: each dot area in the unit area;
- $\alpha$: reflectance of a printing paper; and
- $\beta$: surface reflectance of a printing ink.

Based on the general density formula (D') relating to plate-making or printing, the tonal conversion formula of this invention was so derived as to coincide a theoretical value to a measured value from a viewpoint of a relationship between a basic light intensity value (x) of a sample point (or pixel) (n point) of an original picture in a continuous tone and a dot area percent value (y) of a dot corresponding to the sample point in a printed picture in a halftone, using not density values but light intensity values as picture information.

When conducting the tonal conversion formula of this invention, parameters $y_H$ and $y_S$ are, in general, handled as constants. For example, in the case of multicolor plate-making (C, M and Y), $y_{CH}$ is set to 5% and $y_{CS}$ to 95% in C plate, $y_{MH}=y_{YH}$ to 3% and $y_{MS}=y_{YS}$ to 90% in M and Y plates. Use of an xn value determined in relation with a Dn value measured by a densitometer along with a percent value (% value) for $y_H$ and $y_S$ in the tonal conversion formula will bear a y value in percent.

Another important parameter $\gamma$ can be fixed to 0.45 when calculation of the tonal conversion formula is carried out. This was derived from the course of development of the tonal conversion formula by the inventors where density values are employed as picture information values and demonstrated in a lot of experiments. The parameter $\gamma$ can pertinently change the shape of an X axis color separation curve, in other words, pertinent operation of the $\gamma$ value allows a printed matter with a desirable tonal characteristic (including color tone). As above, the $\gamma$ value is an important parameter, thus needs not to be fixed to the above numeral value.

The numeral values of the parameters in the tonal conversion formula of this invention are differently set according to a standpoint of whether a tone of a given object (real picture) is faithfully reproduced on a printed picture or a tone of a given object is adjusted (corrected or modified) with intent to produce a desired printed picture. In the latter case, it is possible to desirably change the shape of the X axis color separation curve (that is, the desirably change the tone of a picture) by intentionally charging the numerical value of the parameter $\gamma$, whereby various tones of picture are available. For instance, a $\gamma$ value larger than 0 causes the X axis color separation curve to have a convex shape to emphasize a tone from the highlight to the middle. A $\gamma$ value closer to 0 causes the X axis color separation curve to have an approximately straight shape and a $\gamma$ value smaller than 0 causes it to have a concave shape to emphasize a tone from the middle to the shadow.

It is free to arbitrarily process, change or derive the tonal conversion formula of this invention upon conducting it, to say nothing of modifying it as below:

$$y = y_H + [\alpha(1-10^{-k \cdot x})/(\alpha-\beta)] \cdot (y_S - y_H)$$

In the above modified example, $\alpha=1$. In which case, a surface reflectance of a printing paper (base material) used to express a printed picture thereon is assumed to be 100%. $\alpha$ can take any arbitrary value, but there would occur no problem if $\alpha$ is set to 1.0 to be adjusted to zero point of the whiteness of the paper in practice.

In the above modified example, $\alpha=1$, it is possible to set $y_H$ to the highlight H in the printed picture and $y_S$ to the shadow S as intended. This is one of noticeable features of the tonal conversion formula of this invention. It is obvious from the definition that in the highlight H in the printed picture, $x=(x_n-x_H)=0$ and in the shadow S, $x=x_S-x_H$, in other words, it is obvious from:

$$-k \cdot x = -\gamma \cdot (x_S - x_H)/(x_S - x_H) = -\gamma.$$

Use of the tonal conversion formula (the modified example of $\alpha=1$) of this invention allows setting of $y_H$ and $y_S$ on the highlight and the shadow on a printed picture as intended. This is very important when the user estimates a result of his or her work. For example, various X axis color separation curves are available by setting $y_H$ and $y_S$ in a printed picture to desired numeral values and changing the value of $\gamma$ (provided $\alpha=1$). Resulting printed pictures produced under such X axis color separation curves can be easily evaluated in relation with the $\gamma$ value.

An important point in plate-making practice is that X axis color separation curves available in this invention represent a characteristic of gradation and tone from the highlight to the shadow in a printed picture as a final product. The plate-making worker can estimate with accuracy a finish (tone) of a resulting final printed picture from consideration of the shape of the X axis color separation curves obtained with predetermined $y_H$, $y_S$ and $\gamma$ values. This is due to one of the features of the tonal conversion technique according to this invention that all X axis color separation curves respectively set to a plurality of original pictures having different picture quality (for example, taken under different exposure conditions in the case of a photographic original) converge into the same single color separation curve.

On the contrary, conventional D axis color separation curves (where the same $y_H$, $y_S$ and $\gamma$ value are employed) provide different curves corresponding to a plurality of original pictures having different picture quality, whose shapes are quite complicated. Accordingly, accurate estimation of a final printed picture is impossible by only studying the curves. The above feature of this invention is very important. The plate-making worker can display X axis color separation curves of respective color plate (C, M and Y) and a black plate (B) on, for example, a monitor to estimate with accuracy a finish of a final printed picture, thereby eliminating various proofing works. In other words, this invention enables direct plate-making.

In conduction of the tonal conversion formula of this invention, it is possible to regularize the k value so as to be the $\gamma$ value, that is, a value of $(x_S - x_H)$ becomes 1.0. Such regularization of a dynamic range from $x_H$ to $x_S$ to $0-=1.0$ permits easy comparison of X axis color separation curves with each other and study thereof, along with easy calculation of the tonal conversion formula. Light intensity values (x) of respective pixel within the dynamic range, in nature, change according to such regularization. Since such change is, however, relative, there occurs no problem upon setting the color separation curves. Incidentally, in the following description, calculation of the y value were done using a numeral value that has been regularized.

Setting of the X axis color separation curves for color plates used in multi-color plate-making (four plates, C, M, Y and B, are considered to be a set) by conducting the tonal conversion formula of this invention is the same as said C plate under a desired plate design.

As having been described an example producing a printed picture in a halftone through a color output device according to this invention in connection with a color input device (more specifically, an example of plate-making process), it should be noted that this invention is not limited to the above example.

It is a matter of course that the color output device may be what produces a printed picture in a multi-color system of C, M and Y or C, M, Y and B, or what forms a CRT picture (including a liquid crystal display picture) in a RGB system. In the latter case, another tonal conversion formula that has been previously disclosed by the inventors in Japanese Patent Application No. SHO 63-175081 and U.S. Pat. No. 5,014,120, which is analogous to the tonal conversion formula of this invention, is effective in improvement of picture quality of a color television. Meanwhile, in a CRT display picture, the parameter $\alpha$ is preferably conducted as $\alpha = 1.0$.

With respect to a hardware structure of a color output device, a computer in a picture conversion processing unit (or tonal conversion unit) of an existing desired output device determines y values (tonal intensity values) by conducting the tonal conversion formula besides controlling electric current values or electric voltage values in a recording unit (recording head) of the device, or an applying period of the current or the voltage on the basis of said y values to reproduce the color of a halftone picture (i.e., reproduced picture). Meanwhile, the tonal conversion formula may be, of course, calculated by, for example, a workstation used for edition or a platform computer disposed between the input and output devices and the output device may receive and output the results. An arithmetic processing unit of said computer is incorporated with a software that can convert light intensity values (xn) into electric signal values used to produce a picture in a halftone through the tonal conversion formula. Any software is adaptable so long as it has an algorithm of the tonal conversion formula. Such software can take various forms such as PAL having said algorithm as an internal logic, gate array, custom IC, etc.

Figure 3:
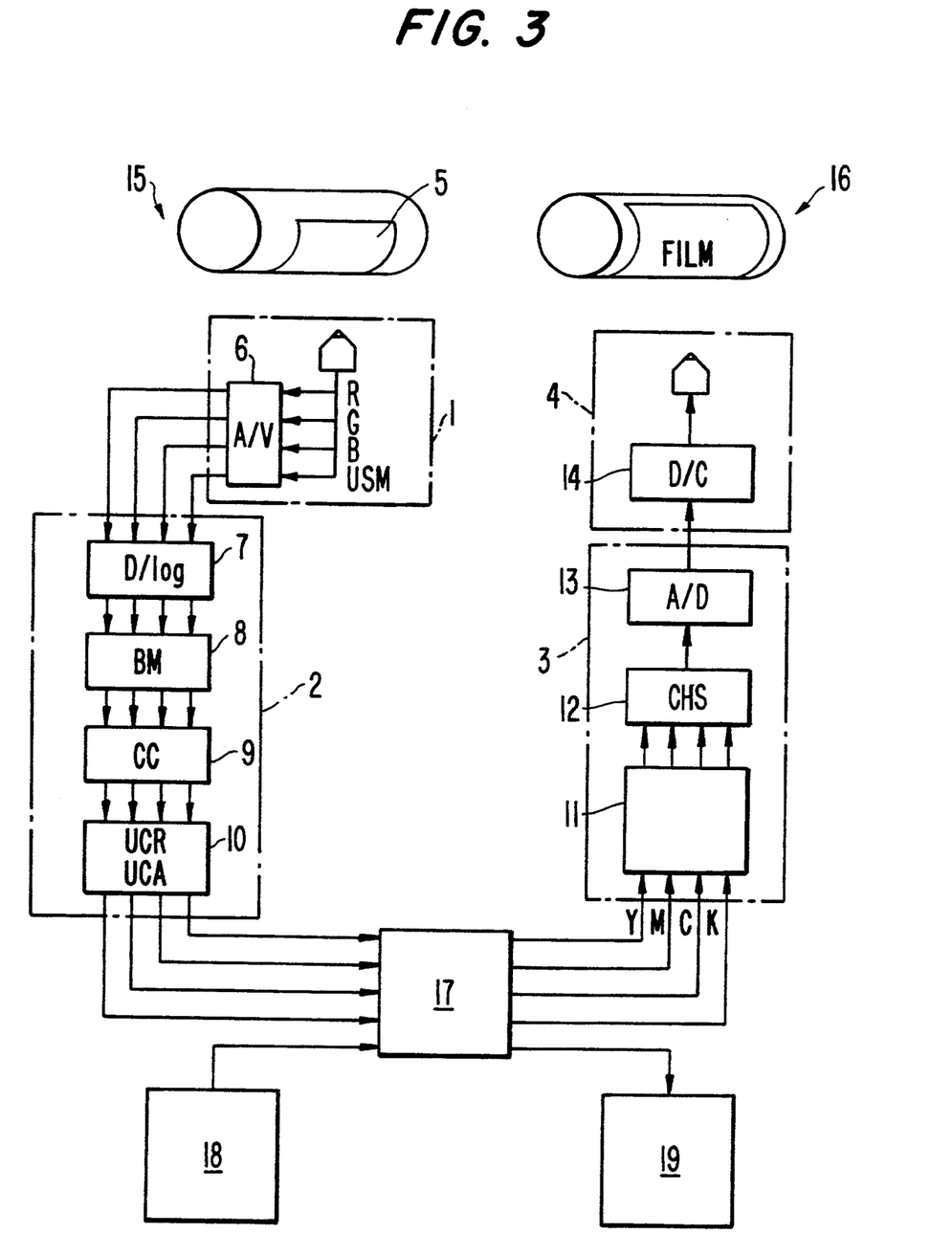
FIG. 3 is a schematic diagram showing an open image data processing system according to this invention.

In an open picture processing system, the input and output devices are arranged, for example, as shown in FIG. 3. Referring to FIG. 3, an open picture processing system comprises a color input device 15, a central station (workstation, CPU) 17, a color output device 16. Another input device 18 and output device 19 may be connected to the central station 17. It should be noted that this invention is not limited to the arrangement illustrated in FIG. 3 as it is merely an example.

The color input device 15 comprises a detection unit 1 and a picture information acquiring unit 2. The detecting unit 1 detects transparent light of each pixel of a color film original 5 stuck onto the input device 15. The input device 15 then outputs R, G, B and USM signals as electric current signals to an A/V conversion unit 6 which converts the incoming R, G, B and USM signals into electric voltage signals. The picture information (light intensity value) acquiring unit 2 includes a logarithmic amplifier 7, a basic masking (BM) unit 8, a color correction (CC) unit 9 and a UCR/UCA unit 10. The logarithmic amplifier of the picture information (light intensity value) acquiring unit 2 computes with logarithm the voltage signals of R, G, B and USM outputted from the detecting unit 1 to determine respective density values, then determine respective light intensity values by using photographic characteristic curves of a color film used for the color film original 5. The basic masking unit 8 separates a gray (K) component from the R, G, B picture information values. The basic masking (BM) unit 8 then separates C, M, Y components which have been converted into light intensity values, then stores them in a given memory. The color correction (CC) unit 9 controls C, M and Y plate components for respective colors of RGB and YMC of the color film original, then determines proportions to express the gray component of the color film original by the three plates of Y, M and C, and the K plate in a UCR (under color removal) part or a UCA (under color addition) part. These data based on light intensity values are stored in a given memory.

The color output device 16 comprises a tone adjusting unit 3 and an output unit 4. The tone adjusting unit 3 includes a tone converting unit 11, a color channel selector 12 and an A/D converter 13. The tone adjusting unit 3 processes the light intensity value data obtained from the color input device 15 by conducting a predetermined tonal conversion formula to adjust the tone. A tone converting unit 11 may, particularly, be in the form of a general-purpose computer having an algorithm of the tonal conversion formula of this invention as a software along with an I/F (interface) of D/A, an electric circuit realizing the algorithm as a logic with a general-purpose IC, an electric circuit including a ROM sustaining calculated results of the algorithm, a PAL realizing the algorithm as an internal logic, a gate array, a custom IC, or the like. It is, of course, possible to provide a computing function to the output device 16 or to the central station 17. Effective dot area rates (ce', me' and ye') obtained in the tonal converting unit 11 are supplied to the color channel selector 12. The color channel selector 12 outputs selectively ye', ce' and ke' in order. These outputs are converted from analog to digital in the A/D converter 13, then outputted to the output unit 4. The output unit 4 controls laser beams in the dot control unit 14 in response to the outputs from the tone converting unit 3 in the dot control unit 14.

Experiment (1) There were used HORIZON (tradename) of AGFA having a CCD optical system as a color input device and Select Set 7000 (tradename) of also AGFA to form dots with laser beams as an output device that is an imagesetter scanner complying with PostScript in an open picture processing system. An experiment was made on whether this invention is effective to realize DIC (Device Independent Color, that is a color reproducing method independent of systems and equipments) in the plate-making practise to produce a printed picture.

As a color film original, Ektachrome 64 (professional film, daylight) (tradename) of Eastman Kodak shown in FIG. 1 was used. To perform color-proofing for output products, there was employed Chromarine Technique by DuPont.

Figure 2:
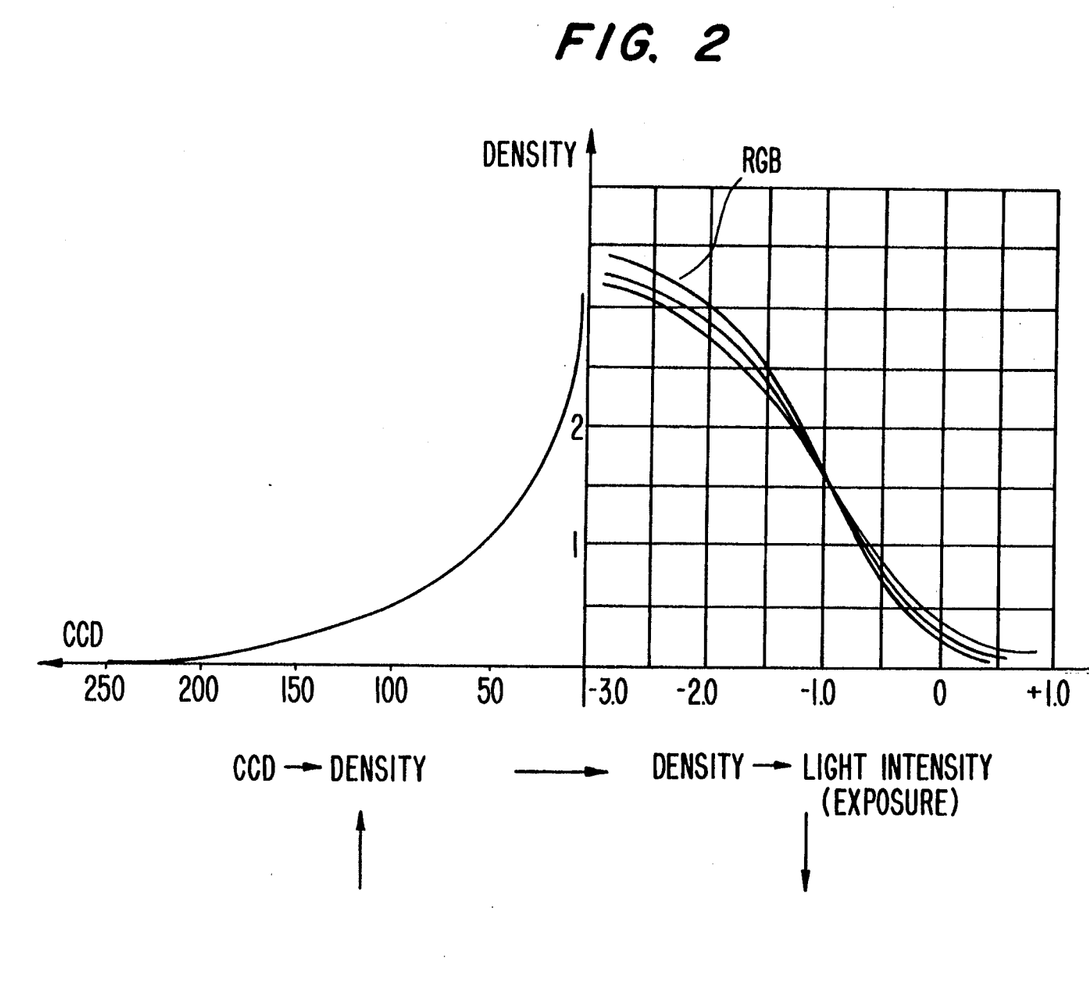
FIG. 2 is a graphical representation illustrating procedures to determine light intensity values (xn) in a color input device.

(2) Data input of light intensity values (xn) in the color input device:

A course to obtain light intensity values (xn) of pixels of the color film original in the color input device is shown in FIG. 2.

The color input device, HORIZON (tradename), employs a CCD to an optical system. Accordingly, a relationship between readings of the CCD (256 tones from 0 to 255) and density values was determined using a predetermined gray scale. Light intensity values (xn) were then determined from a photographic characteristic curve of the color film. The above steps were programmed to be a software so as to automatically read the light intensity values (xn) from the readings of the CCD.

(3) Calculation of dot area % values (y values) in the color output device:

By the use of data of the light intensity values (xn) obtained in the color input device, dot area % values (y values) outputted from the color output device were determined conducting the tonal conversion formula under the following conditions:

For C plate: $\gamma$ value=0.4000, $y_H$=5% and $y_S$=95%; and

For M and Y plates: $\gamma$ value=0.13000, $y_H$=3% and $y_S$=90%. It is noted that in plate-making design of respective color plates (C, M and Y), the $\gamma$ value was so adjusted that a difference in dot area % value between the C plate and M and Y plates was 10% in the middle tone (the dot area % value=10%). It is a general practice in the field of art that the dot area % value for the M and Y plates is set 10% apart from that for the C plate to keep the gray balance and the color balance on a printed picture.

Data obtained in the input and output devices under the conditions above mentioned are shown in Table 4.

TABLE 4

| | Data of input side | | Data of output side |
|---|---|---|---|
| | Dn | Xn | Regularized Xn | Dot area % value y value |
| C | | | | |
| 1 | 0.600 | 0.975 | 0.000 | 5.000 |
| 2 | 0.706 | 1.070 | 0.14 | 23.368 |
| 3 | 0.813 | 1.156 | 0.271 | 38.039 |
| 4 | 1.025 | 1.303 | 0.490 | 59.282 |
| 5 | 1.238 | 1.427 | 0.676 | 74.307 |
| 6 | 1.450 | 1.538 | 0.841 | 85.617 |
| 7 | 1.663 | 1.644 | 1.000 | 95.000 |
| Range | 1.063 | 0.669 | 1.000 | 90.000 |
| M | | | | |
| 1 | 0.660 | 1.087 | 0.000 | 3.000 |
| 2 | 0.775 | 1.180 | 0.134 | 16.213 |
| 3 | 0.890 | 1.268 | 0.260 | 28.162 |
| 4 | 1.120 | 1.418 | 0.476 | 47.634 |

TABLE 4-continued

| | Data of input side | | | Data of output side |
|---|---|---|---|---|
| | Dn | Xn | Regularized Xn | Dot area % value y value |
| 5 | 1.350 | 1.546 | 0.662 | 63.445 |
| 6 | 1.580 | 1.666 | 0.833 | 77.256 |
| 7 | 1.810 | 1.782 | 1.000 | 90.000 |
| Range | 1.150 | 0.695 | 1.000 | 87.000 |
| Y | | | | |
| 1 | 0.708 | 1.165 | 0.000 | 3.000 |
| 2 | 0.798 | 1.224 | 0.114 | 14.263 |
| 3 | 0.889 | 1.281 | 0.223 | 24.735 |
| 4 | 1.071 | 1.390 | 0.433 | 43.908 |
| 5 | 1.253 | 1.492 | 0.630 | 60.790 |
| 6 | 1.434 | 1.592 | 0.823 | 76.837 |
| 7 | 1.616 | 1.684 | 1.000 | 90.000 |
| Range | 0.908 | 0.519 | 1.000 | 87.000 |

(4) Comparative experiment:

In order to compare experimental results obtained through the use of the above input and output devices making up an open system according to this invention, an experiment was carried out, incorporating two techniques of this invention into 455 DIGITAL COLOR SCANNER (tradename) of ISOMET practically known in the art as a so-called high-end color scanner that can provide a high-quality printed picture. Namely, a software to determine light intensity values (xn) from density values was incorporated in a density detecting unit of said scanner and another software to conduct the tonal conversion formula of this invention in a tone converting unit at the same time to make the experiment.

Experimental results obtained through the use of said input and output devices making up the open picture processing system according to this invention were fully satisfactory. Machine plates made through the open system according to this invention well reproduced a color tone and a gradation of an original picture and had the same quality as obtained through an high-end scanner. This proves that this invention is efficient to establish DIC in an open picture processing system.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of the invention.

What is claimed is:

1. A tonal conversion method implemented by an image data processing system which includes an input device and an output device into and from which color picture information is independently inputted and outputted, the input device and the output device being discrete and functionally independent of each other, said method for converting a color film original into a tonal converted image independently of systems and equipments forming the image data processing system and comprising the steps of:

using the color input device to scan the color film original to obtain RGB data indicative of image density values of the color film original, to convert the RGB data into corresponding light intensity values and to store the light intensity values therein; and using the color output device to receive the light intensity values stored in the color input device, to convert the thus received light intensity values into tonal intensity values in accordance with a tonal conversion formula, and to obtain the tonal converted image using the tonal intensity values;

wherein said tonal conversion formula is represented by $$y = y_H + [\alpha(1-10^{-k \cdot x})/(\alpha-\beta)] \cdot (y_S - y_H)$$

where x is a basic light intensity value $x = (x_n - x_H)$, that is a difference between a picture information value (Dn) of a given pixel at point n in the color film original through a density characteristic curve defined in a D–X orthogonal coordinate system and a picture information value ($X_H$) correlating with light intensity corresponding to a density value ($D_H$) of the brightest part (H part) of the color film original, a D axis of the D–X orthogonal coordinate system representing density of the color film used upon photographing the color film original and an X axis of the D–X orthogonal coordinate system representing picture information values correlating with light intensity;

y is a tonal intensity value of a pixel in the tonal converted image corresponding to the given pixel at the point n of the color film original;

$y_H$ is a tonal intensity value set in advance to the brightest part of the tonal converted image corresponding to the brightest part of the color film original;

$y_S$ is a tonal intensity value set in advance to the darkest point of the tonal converted image corresponding to the darkest part of the color film original;

$\alpha$ is a surface reflectance of a recording medium to be used to record the tonal converted image;

$\beta$ is a value determined by $\beta = 10^\tau$;

k is a value determined by $k = \oplus/(x_S - x_H)$, where $x_S$ is a picture information value correlating to light intensity determined from the density value ($D_S$) of the darkest part of the color film original through the density characteristic curve defined in the D–X orthogonal coordinate system; and $\oplus$ is a given coefficient.

2. A method according to claim 1, wherein the color output device forms a halftone output picture of a CMYK system.

3. A method according to claim 1, wherein the color output device forms an output picture of an RGB system.

4. A method for configuring an image data processing system to convert a color film original into a tonal converted image independently of systems and equipments forming the image data processing system, the system including an input device and an output device into and from which color picture information is independently inputted and outputted, said input device and said output device being discrete and functionally independent of each other, said method comprising the steps of:

equipping the color input device to scan the color film original to obtain RGB data indicative of image density values of the color film original, to convert the RGB data into corresponding light intensity values and to store the light intensity values therein; and equipping the color output device to receive the light intensity values stored in the color input device, to convert the thus received light intensity values into tonal intensity values in accordance with a tonal conversion formula, and to obtain the tonal converted image using the tonal intensity values;

wherein said tonal conversion formula is represented by $$y = y_H + [\alpha(1-10^{-k \cdot x})/(\alpha-\beta)] \cdot (y_S - y_H)$$

where x is a basic light intensity value $x = (x_n - x_H)$, that is a difference between a picture information value (Dn) of a given pixel at point n in the color film original through a density characteristic curve defined in a D–X orthogonal coordinate system and a picture information value ($X_H$) correlating with light intensity corresponding to a density value ($D_H$) of the brightest part (H part) of the color film original, a D axis of the D–X orthogonal coordinate system representing density of the color film used upon photographing the color film original and an X axis of the D–X orthogonal coordinate system representing picture information values correlating with light intensity;

y is a tonal intensity value of a pixel in the tonal converted image corresponding to the given pixel at the point n of the color film original;

$y_H$ is a tonal intensity value set in advance to the brightest part of the tonal converted image corresponding to the brightest part of the color film original;

$y_S$ is a tonal intensity value set in advance to the darkest point of the tonal converted image corresponding to the darkest part of the color film original;

$\alpha$ is a surface reflectance of a recording medium to be used to record the tonal converted image;

$\beta$ is a value determined by $\beta = 10^\tau$;

k is a value determined by $k = \gamma/(x_S - x_H)$, where $x_S$ is a picture information value correlating to light intensity determined from the density value ($D_S$) of the darkest part of the color film original through the density characteristic curve defined in the D–X orthogonal coordinate system; and $\gamma$ is a given coefficient.

5. A method according to claim 4, wherein the color output device forms a halftone output picture of a CMYK system.

6. A method according to claim 4, wherein the color output device forms an output picture of an RGB system.

* * * * *